United States Patent
Billimack

(10) Patent No.: US 9,772,049 B2
(45) Date of Patent: Sep. 26, 2017

(54) UNIVERSAL SUPPORT CLAMP

(71) Applicant: Caterpillar Inc., Peoria, IL (US)

(72) Inventor: James John Billimack, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 53 days.

(21) Appl. No.: 14/822,736

(22) Filed: Aug. 10, 2015

(65) Prior Publication Data

US 2017/0045159 A1 Feb. 16, 2017

(51) Int. Cl.
 F16L 3/04 (2006.01)
 F16B 2/24 (2006.01)
 F16L 3/10 (2006.01)
 F16L 3/06 (2006.01)
 F16L 3/02 (2006.01)
 H02G 3/32 (2006.01)

(52) U.S. Cl.
 CPC ...... *F16L 3/04* (2013.01); *F16B 2/24* (2013.01); *F16B 2/248* (2013.01); *F16L 3/02* (2013.01); *F16L 3/06* (2013.01); *F16L 3/1033* (2013.01); *H02G 3/32* (2013.01)

(58) Field of Classification Search
 CPC ..... F16B 2/24; F16B 2/248; F16L 3/02; F16L 3/04; F16L 3/06; F16L 3/1033; H02G 3/32
 USPC ........ 248/67.7, 68.1, 74.1, 74.2, 302, 216.1, 248/216.4, 217.3, 217.4, 218.1, 218.2
 See application file for complete search history.

(56) References Cited

U.S. PATENT DOCUMENTS

| | | | | |
|---|---|---|---|---|
| 1,381,232 A | * | 6/1921 | Pleister | F16L 3/06 248/69 |
| 1,381,233 A | * | 6/1921 | Pleister | F16L 3/06 248/69 |
| 1,381,238 A | * | 6/1921 | Pleister | F16L 3/06 248/69 |
| 1,776,343 A | * | 9/1930 | Allyn | F16L 3/10 248/74.4 |
| 1,779,153 A | * | 10/1930 | Withrow | B60T 11/00 188/205 A |
| 1,995,370 A | * | 3/1935 | Walters | F16B 5/0685 248/68.1 |
| 2,231,153 A | * | 2/1941 | Camiener | B60R 13/0206 248/231.9 |
| 2,265,393 A | * | 12/1941 | Place | F16B 2/248 24/564 |

(Continued)

FOREIGN PATENT DOCUMENTS

| | | | | |
|---|---|---|---|---|
| CA | 2197257 A1 | * | 8/1998 | F16L 3/04 |
| CH | 290792 A | * | 5/1953 | F16L 3/04 |

(Continued)

*Primary Examiner* — Eret McNichols
(74) *Attorney, Agent, or Firm* — Bart A. Fisher

(57) ABSTRACT

A support clamp for securing components to a machine structure is disclosed herein. The support clamp is formed of a continuous wire that includes a first fastening portion, a second fastening portion, a first component receiving portion, and a second component receiving portion. The first and second fastening portions include a first arc shape extending in a first plane with the second fastening portion being symmetrical to the first fastening portion. The first and second component receiving portions include a second arc shape, each extending away from the first plane.

4 Claims, 2 Drawing Sheets

(56) References Cited

U.S. PATENT DOCUMENTS

| | | | | |
|---|---|---|---|---|
| 2,560,486 A * | 7/1951 | Shears | F16L 3/227 | 24/338 |
| 2,618,033 A * | 11/1952 | Tinnerman | F16B 5/125 | 24/129 B |
| 2,681,196 A * | 6/1954 | Lind | F16L 3/04 | 174/159 |
| 2,723,432 A * | 11/1955 | Flora | F16B 5/0685 | 248/73 |
| 2,729,412 A * | 1/1956 | Amesbury | F16L 3/2235 | 24/339 |
| 2,733,492 A * | 2/1956 | Copell | A24F 9/14 | 24/457 |
| 2,885,168 A * | 5/1959 | Silverman | F16B 15/02 | 248/71 |
| 2,886,270 A * | 5/1959 | Wendela | F16L 3/04 | 24/132 R |
| 2,923,510 A * | 2/1960 | Walch | F16L 3/233 | 174/40 CC |
| 2,924,671 A * | 2/1960 | Barry | H04M 1/04 | 248/302 |
| 2,961,210 A * | 11/1960 | Pfaff | F16L 3/04 | 248/205.1 |
| 3,066,900 A * | 12/1962 | Holton | F16B 5/0685 | 24/339 |
| 3,216,684 A * | 11/1965 | Larson | E04H 17/10 | 248/71 |
| 3,216,685 A * | 11/1965 | Raymond | F16B 2/245 | 248/316.7 |
| 3,226,468 A * | 12/1965 | Patton | F16L 3/04 | 174/503 |
| 3,232,569 A * | 2/1966 | Deardorf | F16L 3/1033 | 248/74.1 |
| 3,262,662 A * | 7/1966 | Gastaldi | H02G 3/26 | 248/68.1 |
| 3,430,904 A * | 3/1969 | Soltysik | F16L 3/13 | 248/73 |
| 3,491,971 A * | 1/1970 | Fisher | F16L 3/13 | 24/339 |
| 3,529,796 A * | 9/1970 | MacDonald | H02G 3/26 | 24/457 |
| 3,532,312 A * | 10/1970 | Kopf | F16L 3/23 | 248/303 |
| 3,599,915 A * | 8/1971 | Soltysik | F16L 3/237 | 248/68.1 |
| 3,785,598 A * | 1/1974 | Gillstrap | F16L 3/14 | 248/317 |
| 4,736,923 A * | 4/1988 | Losada | F16B 19/14 | 248/216.1 |
| 5,031,864 A * | 7/1991 | Krol | F16L 3/04 | 248/71 |
| 5,040,752 A * | 8/1991 | Morrison | A47B 21/06 | 248/71 |
| 5,178,503 A * | 1/1993 | Losada | F16B 19/14 | 227/124 |
| 5,624,220 A * | 4/1997 | Janssen | B25C 1/18 | 248/74.5 |
| 5,706,557 A | 1/1998 | Beicht et al. | | |
| 5,752,681 A * | 5/1998 | Janssen | F16L 3/04 | 248/65 |
| 5,897,082 A * | 4/1999 | Losada | F16L 3/04 | 248/65 |
| 6,079,765 A * | 6/2000 | Zaguskin | B60R 16/02 | 248/68.1 |
| 6,311,935 B1 * | 11/2001 | Mullen, Jr. | H02G 3/32 | 24/16 PB |
| D539,638 S * | 4/2007 | Franks, Jr. | D8/395 | |
| 7,770,851 B2 * | 8/2010 | Michaud | F16L 3/04 | 248/65 |
| 8,464,987 B1 | 6/2013 | DeCesare et al. | | |
| 8,740,157 B2 * | 6/2014 | Jatzke | B60R 16/0215 | 24/115 R |
| 2006/0222453 A1 * | 10/2006 | Plaschkes | F16L 3/04 | 403/110 |
| 2010/0260573 A1 * | 10/2010 | Gardner | F16L 3/04 | 411/81 |
| 2011/0031356 A1 * | 2/2011 | Vonada | A01G 17/04 | 248/71 |
| 2014/0263874 A1 | 9/2014 | DeCesare et al. | | |
| 2015/0282642 A1 * | 10/2015 | Wolff | H02G 3/32 | 211/124 |
| 2016/0076671 A1 * | 3/2016 | Lawrence | H02G 3/32 | 248/74.5 |

FOREIGN PATENT DOCUMENTS

| | | | | |
|---|---|---|---|---|
| CN | 203080807 U | | 7/2013 | |
| DE | 102004029391 A1 * | | 1/2006 | F16L 3/04 |
| EP | 2261544 B1 | | 8/2011 | |
| GB | 556847 A * | | 10/1943 | F16L 3/04 |
| GB | 1207741 A * | | 10/1970 | F16B 2/248 |
| JP | 2006308048 A | | 11/2006 | |
| JP | 2015083879 A | | 4/2015 | |
| WO | WO 2016040950 A2 * | | 3/2016 | H02G 3/32 |

* cited by examiner

UNIVERSAL SUPPORT CLAMP

TECHNICAL FIELD

The present disclosure generally pertains to support clamps, and is directed toward a universal support clamp for components of earth moving machines.

BACKGROUND

Support clamps for routing and securing components, such as hoses, conduits, tubes, wires, wire harnesses, oil lines, or fuel lines, for mining and construction machines to various structures, such as the chassis of the machine, are generally designed for a component with a specific diameter. If a component with a different diameter is used, the component will not fit correctly and the component may be damaged.

Adjustable clamps, such as the adjustable conduit clamp disclosed in U.S. Pat. No. 5,536,587 to DeCesare et al. may be used for components of different diameters. DeCesare et al discloses an adjustable conduit clamp that has a clampback and a strap that interfits therewith. The clampback has sidewalls configured to be placed against a structure and a portion of each sidewall configured to support a conduit. A first spacer is positioned between the sidewalls at a first region of the sidewalls and a second spacer positioned between the sidewalls at a second region. A cantilever member extends from the second spacer and is positioned between the first and second sidewalls, the cantilever member having a free end movable relative to the sidewalls and spaced from an end of the first spacer so as to form an opening therebetween for passage of the strap. The strap has a first end portion shaped to contact a conduit and a second end portion dimensioned for passage through the opening in the clampback.

The present disclosure is directed toward a support clamp overcoming one or more of the problems discovered by the inventor.

SUMMARY OF THE DISCLOSURE

A support clamp for securing components to a machine structure is disclosed herein. The support clamp includes a first side and a second side. The first side includes a first fastening portion, a first spring portion, and a first conduit receiving portion. The first fastening portion includes a first arc shape of a wire extending in a first plane. The first spring portion extends from the first fastening portion. The first spring portion includes a first segment of the wire. The first conduit receiving portion extends from the first spring portion. The first conduit receiving portion includes a second arc shape of the wire extending away from the first plane.

The second side includes a second fastening portion, a second spring portion, and a second conduit. The second fastening portion includes a third arc shape of the wire extending in the first plane. The second fastening portion is symmetrical to the first fastening portion. The second spring portion extends from the second fastening portion. The second spring portion includes a second segment of the wire. The second conduit receiving portion extends from the second spring portion. The second conduit receiving portion includes a fourth arc shape of the wire extending away from the first plane.

DETAILED DESCRIPTION

The systems and methods disclosed herein include a universal support clamp for routing and securing components, such as hoses, conduits, tubes, wires, wire harnesses, oil lines or fuel lines, of mining and construction machines to a structure of the machine. In embodiments, the universal support clamp includes a single wire structure with a fastening section for securing the universal support clamp to a structure of the machine and a component receiving section that holds a component, such as a hose, conduit, tube, wire, wire harness, oil line or fuel line, between the universal support clamp and the machine structure. The single wire structure may reduce the amount of material needed to form the clamp and may be capable of receiving multiple different sizes of components without adjustment.

Figure 1:
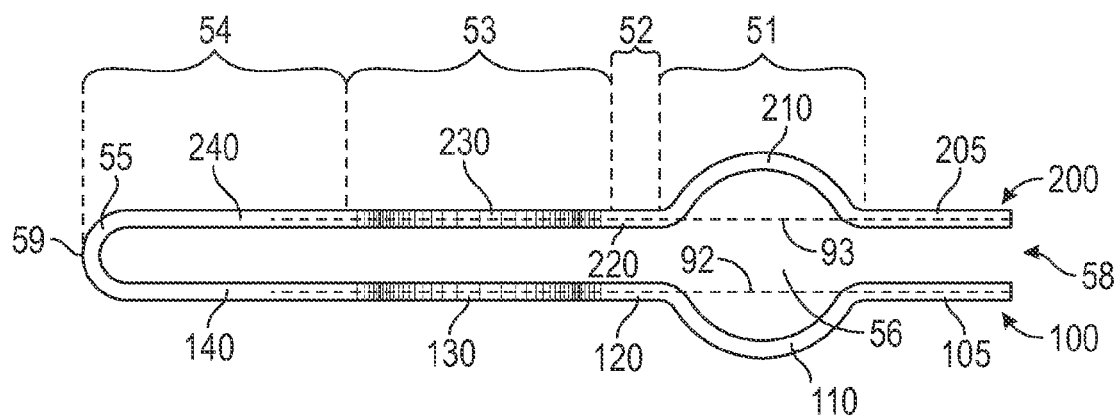
FIG. 1 is a top view of a first embodiment of a universal support clamp.
Figure 2:
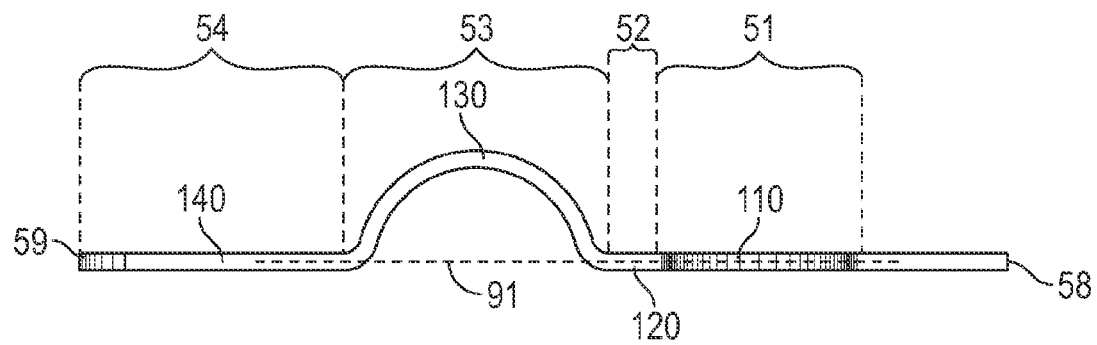
FIG. 2 is a side view of the universal support clamp of FIG. 1.

FIG. 1 is a top view of a first embodiment of a universal support clamp 50. FIG. 2 is a side view of the universal support clamp 50 of FIG. 1. As illustrated, the universal support clamp 50 may be formed of a single wire. The wire may be formed of, inter alia, metal, such as spring steel, rigid plastic, or carbon fiber. The wire may have a uniform cross-section, such as a square or a circle. Referring to FIGS. 1 and 2, the universal support clamp 50 may include a first side 100 and a second side 200. The first side 100 and the second side 200 generally extend from a first end 58 to a second end 59, the second end 59 being distal to the first end 58 and connecting the first side 100 to the second side 200. The first side 100 and the second side 200 are subdivided into various portions which may be combined to form various sections of the universal support clamp 50.

The first side 100 may include a first fastening portion 110, a first spring portion 120, a first component receiving portion 130, and a first tail portion 140. The first spring portion 120 and the first tail portion 140 may be parallel to each other and may be aligned.

The first fastening portion 110 includes a curved segment of the wire, and may be adjacent to and connect to the first spring portion 120. The first fastening portion 110 includes an arc shape with an arc length that is shaped to accommodate the passage of a fastening device, such as a nut, a bolt head with or without a washer, a rivet, or a spot weld, therethrough. The arc may include a constant diameter. The first fastening portion 110 may be located within a first plane 91 that includes the first spring portion 120 and the first tail portion 140. The convex side of the first fastening portion 110 may generally face way from the second side 200, while the concave side of the first fastening portion 110 may generally face toward the second side 200. The various planes referenced in the figures are for reference only. The planes generally extend perpendicular to the page with their locations illustrated in the figures as dashed lines.

The first spring portion 120 connects the first fastening portion 110 to the first component receiving portion 130. The first spring portion 120 may include a straight segment of the wire. The first component receiving portion 130 extends from the first spring portion 120 and includes a curved segment of the wire. The first component receiving portion 130 includes an arc shape with an arc length. The arc may include a constant diameter. The first component receiving portion 130 may extend away from the first plane 91. The first component receiving portion 130 may be located within a second plane 92 that includes the first spring portion 120 and the first tail portion 140. The second plane 92 may be transverse, such as perpendicular, to the first plane 91.

The first tail portion 140 extends from the first spring portion 120 towards the second end 59 in the direction opposite the first spring portion 120. The first tail portion 140 may include a straight segment of the wire.

In some embodiments, such as the embodiment illustrated, the first side 100 also includes a first prong 105. The first prong 105 may extend from the first fastening portion 110 to the first end 58 in the direction opposite the first spring portion 120. The first prong 105 may also include a straight segment of the wire and may be a parallel and may be aligned with the first spring portion 120 and the first tail portion 140. The first prong 105 may act as a cantilever point or may act as a guide or provide a gripping location when locating the universal support clamp 50 around a partially inserted fastener.

The second side 200 may include a second fastening portion 210, a second spring portion 220, a second component receiving portion 230, and a second tail portion 240. The second spring portion 220 and the second tail portion 240 may be parallel to each other and may be aligned.

The second fastening portion 210 may be adjacent to and connect to the second spring portion 220. The second fastening portion 210 is adjacent the first fastening portion 110 and may be spaced apart from the first fastening portion 110. The second fastening portion 210 may include a curved segment of the wire. The second fastening portion 210 includes an arc shape with an arc length. The arc may include a constant diameter. The arc shape, arc length, and diameter of the second spring portion 220 may be the same as the arc shape, arc length, and diameter of the first spring portion 120. The second fastening portion 210 may be located within the first plane 91 that also includes the second spring portion 220 and the second tail portion 240 along with the first fastening portion 110. The convex side of the second fastening portion 210 may generally face way from the first side 200, while the concave side of the second fastening portion 210 may generally face toward the first side 100 and the first fastening portion 110. The second fastening portion 210 may be symmetrical to the first fastening portion 110. The first fastening portion 110 and the second fastening portion 210 may form a fastening section 51 defining a fastener passage 56. By changing the shapes of first fastening portion 110 and second fastening portion 21, the fastener passage 56 defined therebetween will be changed as well.

The second spring portion 220 connects the second fastening portion 210 to the second component receiving portion 230. The second spring portion 220 may include a straight segment of the wire and may be parallel to the first spring portion 120. The second spring portion 220 is adjacent the first spring portion 120 and may not contact the first spring portion 120. The first spring portion 120 and the second spring portion 220 may form a spring section 52.

The second component receiving portion 230 extends from the second spring portion 220 and includes a curved segment of the wire. The second component receiving portion 230 includes an arc shape with an arc length. The arc may include a constant diameter. The arc shape, arc length, and diameter of the second component receiving portion 230 may be the same as the arc shape, arc length, and diameter of the first component receiving portion 130. The second component receiving portion 230 may extend away from the first plane 91. The second component receiving portion 230 may be located within a third plane 93 that includes the second spring portion 220 and the second tail portion 240. The third plane 93 may be transverse, such as perpendicular, to the first plane 91 and parallel to the second plane 92. The concavity of the first component receiving portion 130 and the second component receiving portion 230 may generally face the same direction. The first component receiving portion 130 and the second component receiving portion 230 may form a component receiving section 53.

The second tail portion 240 extends from the second spring portion 220 towards the second end 59 in the direction opposite the second spring portion 220. The second tail portion 240 may include a straight segment of the wire. The second tail portion 240 may be parallel to the first tail portion 140. The first tail portion 140 and the second tail portion 240 may form a tail section 54.

In some embodiments, such as the embodiment illustrated, the second side 200 also includes a second prong 205. The second prong 205 may extend from the second fastening portion 210 to the first end 58 in the direction opposite the second spring portion 220. The second prong 205 may also include a straight segment of the wire and may be a parallel and may be aligned with the second spring portion 220 and the second tail portion 240. The second prong 205 may act as a cantilever point or may act as a guide or provide a gripping location when locating the universal support clamp 50 around a partially inserted fastener. The second prong 205 may be parallel to the first prong 105.

The fastening section 51 includes the first fastening portion 110 and the second fastening portion 210. The fastening section 51 is configured to receive a fastener 60 (refer to FIGS. 3-5) and is the section of the universal support clamp 50 that will be secured to the machine.

The spring section 52 includes the first spring portion 120 and the second spring portion 220 and is configured to bend and supply at least a portion of the force used to hold the a component, such as a hose, conduit, tube, wire, wire harness, oil line, or fuel line, in place between the universal support clamp 50 and a machine structure. The machine structure may be the structure of any component or sub-component of the mining or construction machine, such as the chassis of the machine.

The component receiving section 53 includes the first component receiving portion 130 and the second component receiving portion 230. The component receiving section 53 is configured to hold a component, such as a hose, conduit, tube, wire, wire harness, oil line, or fuel line, between the universal support clamp 50 and the machine structure. The component receiving section 53 may be configured to apply a force to the component. Parts of the component receiving section 53 may also bend and supply at least a portion of the force used to hold the component in place.

The tail section 54 may include the first tail portion 140, the second tail portion 240, and the connecting section 55. The tail section 54 may be used to grip the universal support clamp 50 and lift the second end 59 away from the machine structure so that the component can be inserted between the component receiving section 53 and the machine structure.

The first side 100 and the second side 200 may be connected by the connecting section 55 forming a continuous wire. The connecting section 55 may be a U-shaped bend, such as a one-hundred and eighty degree bend, in the wire and may be located at either end of the universal support clamp 50. In the embodiment illustrated, the connecting section 55 is located at the second end 59 distal to the component receiving section and connects the first tail portion 140 to the second tail portion 240. The tail section 54 including the connecting section 55 may form the connection between the first component receiving portion 130 and the second component receiving portion 230.

As illustrated, the end including the connecting section 55 is closed and the end opposite the connecting section 55 may be open. In the embodiment illustrated, the first end 58 is open with the first prong 105 not being directly connected to the second prong 205. In embodiments, the first end 58 is proximal the fastening section 51 including the first fastening portion 110 and the second fastening portion 210.

Figure 3:
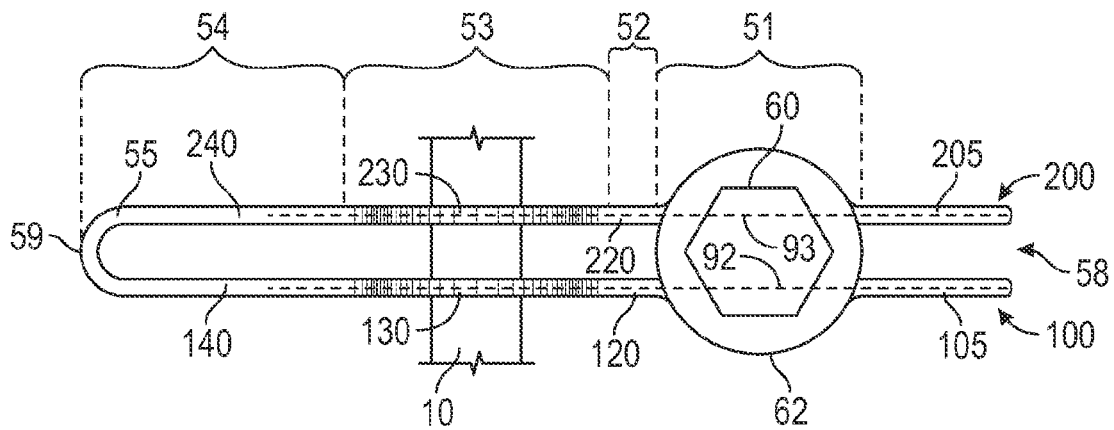
FIG. 3 is a top view of an alternate embodiment of the universal support clamp of FIGS. 1-2 fastened to a machine structure and holding a component therebetween.
Figure 4:
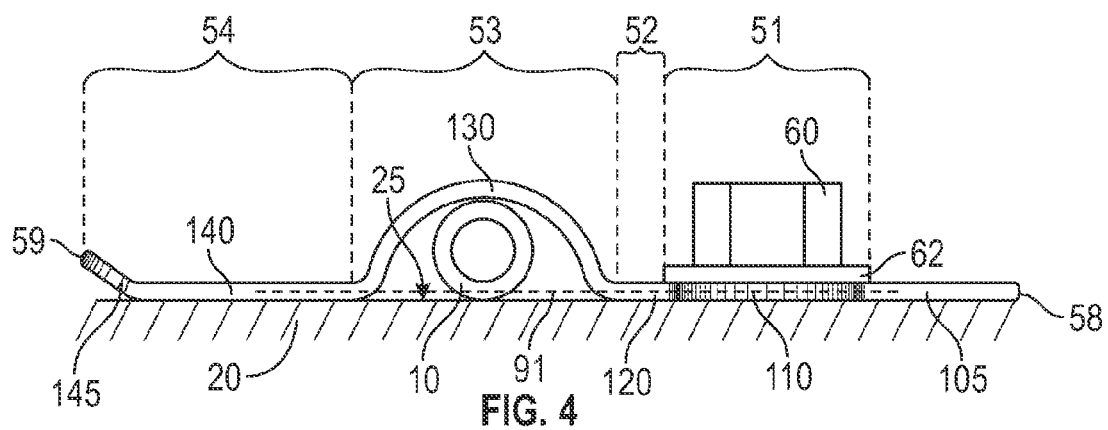
FIG. 4 is a side view of the universal support clamp of FIG. 3.

FIG. 3 is a top view of an alternate embodiment of the universal support clamp 50 of FIGS. 1-2 fastened to a machine structure 20 and holding a component therebetween. FIG. 4 is a side view of the universal support clamp 50 of FIG. 3. In the embodiment illustrated in FIGS. 3 and 4, the tail section 54 includes a gripping portion 145. The gripping portion 145 is angled relative to the surface 25 of the machine structure 20 and relative to any of the straight segments of the universal support clamp 50, such as the first tail portion 140, the second tail portion 240, the first spring portion 120, and the second spring portion 220. The gripping portion 145 may extend at an angle relative to the first tail portion 140 and the second tail portion 240, such as at an obtuse angle. The gripping portion 145 may also extend up from the surface 25 of the machine structure 20 when the universal support clamp is fastened to the machine structure 20. The gripping portion may allow for an easier grip of the second end 59 for lifting the second end 59 during installation of the component 10, such as a hose, conduit, tube, wire, wire harness, oil line, or fuel line, between the universal support clamp 50 and the machine structure 20.

As illustrated in FIG. 4, the arcs of the first fastening portion 110 and the second fastening portion 210 may be configured to extend along the surface 25 and may be located in a plane parallel to the surface 25 when the universal support clamp 50 is fastened to the machine structure 20. The universal support clamp 50 is secured to the machine structure 20 by a fastening device such as fastener 60. A washer 62 may be located between the fastener 60 and the fastening section 51. In the embodiment illustrated, fastener 60 is a bolt with a washer 62, other fastening devices, such as a nut, a bolt head without a washer, a rivet, or a spot weld, may be used.

As illustrated in FIGS. 3 and 4, the arcs of the first component receiving portion 130 and the second component receiving portion 230 may each extend up from the surface 25 when the universal support clamp 50 is fastened to the machine structure 20. In embodiments, the first component receiving portion 130 and the second component receiving portion 230 may each extend up in a plane perpendicular to the surface 25. The concavity of the first component receiving portion 130 and the second component receiving portion 230 may face in the same direction, such as towards the surface 25. The component 10 is held between the component receiving section 53 and the surface 25.

As illustrated in FIG. 4, the first spring portion 120 and the second spring portion 220 may extend along the surface 25 when the universal support clamp 50 is fastened to the machine structure 20.

Figure 5:
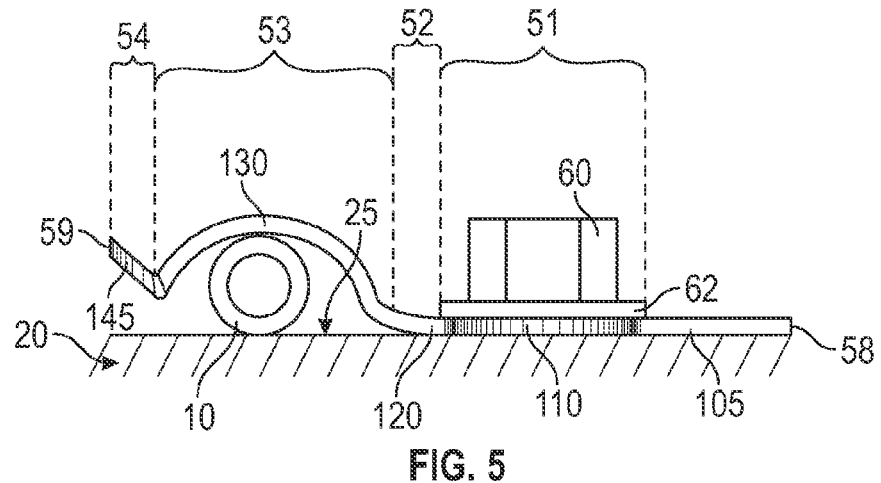
FIG. 5 is a side view of an alternate embodiment of the universal support clamps of FIGS. 1-4 fastened to a machine structure and holding a component therebetween.

FIG. 5 is a side view of an alternate embodiment of the universal support clamps 50 of FIGS. 1-4 fastened to a machine structure 20 and holding a component therebetween. In the embodiment illustrated in FIG. 5, the tail section 54 merely includes a gripping portion 145. The gripping portion 145 may also be a connecting section 55. In this embodiment, the gripping portion 145 connects directly to the component receiving section 53, such as to the first component receiving portion 130 and to the second component receiving portion 230.

The universal support clamp 50 may be formed by, for example, bending a wire of spring steel, die cutting the spring steel, or injection molding a plastic material. At least a portion of the universal support clamp 50, such as the component receiving section 53 or the tail section 54, may be covered by a protection material. The covering may be accomplished by, for example, coating at least a portion of the universal support clamp 50 with the protection material or covering at least a portion of the universal support clamp 50 with a sleeve formed of the protection material. The covering material may be, inter alia, rubber, plastic, or other materials that may reduce abrasion between the universal support clamp 50, the component, such as the component 10, and the machine structure 20.

INDUSTRIAL APPLICABILITY

Many different sized components, such as hoses, conduits, tubes, wires, wire harnesses, oil lines, or fuel lines, may be used on a machine, such as a mining or construction machine. Different sized components may be used for the same function when manufacturing or repairing the machine. When replacing one component with a different sized component, all of the clamps for that component may also need to be replaced to prevent damage to the component.

The universal support clamp 50 may be configured to accept components 10 of multiple sizes. As illustrated in FIG. 3, components 10 with diameters similar to the height of the component receiving section 53 may be held between the component receiving section 53 and the surface 25, while each end of the component receiving section 53 contacts the surface 25. Referring to FIG. 4, components 10 with larger diameters may be held between the component receiving section 53 and the surface 25 while the end of the component receiving section 53 opposite the spring section 52 is lifted away from the surface 25. Bending at the spring section 52 along with bending at the component receiving section 53 may supply a force that holds the component 10 in place. The universal support clamp 50 may not have to be replaced when a component 10 is replaced with a component 10 of a different size, which may reduce the time needed to replace the component 10 and may reduce the costs associated with the replacement of the component 10.

The wire structure of the universal support clamp 50 may reduce the amount of material used to manufacture a clamp, which may further reduce the costs associated with the installation or replacement of a component 10.

The preceding detailed description is merely exemplary in nature and is not intended to limit the invention or the application and uses of the invention. The described embodiments are not limited to use in conjunction with a particular type of machine. Hence, although the present disclosure, for convenience of explanation, describes a universal harness clamp for components of mining and construction machines, it will be appreciated that the universal harness clamp in accordance with this disclosure can be implemented in various other configurations and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A support clamp for securing a component to a machine structure, the support clamp comprising:
   a fastening section including
      a first fastening portion including a first curved segment of a wire, and
      a second fastening portion adjacent the first fastening portion and including a second curved segment of the wire, the second fastening portion being symmetrical to the first fastening portion;
   a spring section including
      a first spring portion extending from the first fastening portion and including a first straight segment of the wire, and
      a second spring portion extending from the second fastening portion parallel to the first spring portion and including a second straight segment of the wire;
   a component receiving section including
      a first component receiving portion extending from the first spring portion and including a third curved segment of the wire, and
      a second component receiving portion adjacent the first component receiving portion extending from the second spring portion and including a fourth curved segment of the wire, wherein the concavity of the first component receiving portion and the concavity of the second component receiving portion face in the same direction;
   a tail section of the wire connecting the first component receiving portion to the second component receiving portion;
   wherein the first fastening portion, the second fastening portion, the first spring portion, and the second spring portion extend on a first plane; and
   further comprising a first prong extending from the first fastening portion and aligned with the first spring portion, and a second prong extending from the second fastening portion and aligned with the second spring portion, wherein the first prong and the second prong extend on the first plane.

2. The support clamp of claim 1, wherein the first component receiving portion and the second component receiving portion each extend on a plane transverse to the first plane.

3. The support clamp of claim 1, wherein the tail section includes a first tail portion extending from the first component receiving portion aligned with the first spring portion, a second tail portion extending from the second component receiving portion aligned with the second spring portion, and a connecting section distal to the component receiving section and extending from the first tail portion to the second tail portion in a U-shaped bend.

4. The support clamp of claim 1, wherein the component receiving section is covered by a protection material to reduce abrasion between the support clamp and the component.

* * * * *